(No Model.)
C. H. ELLIS.
VEHICLE SHAFT SUPPORT.
No. 488,000. Patented Dec. 13, 1892.
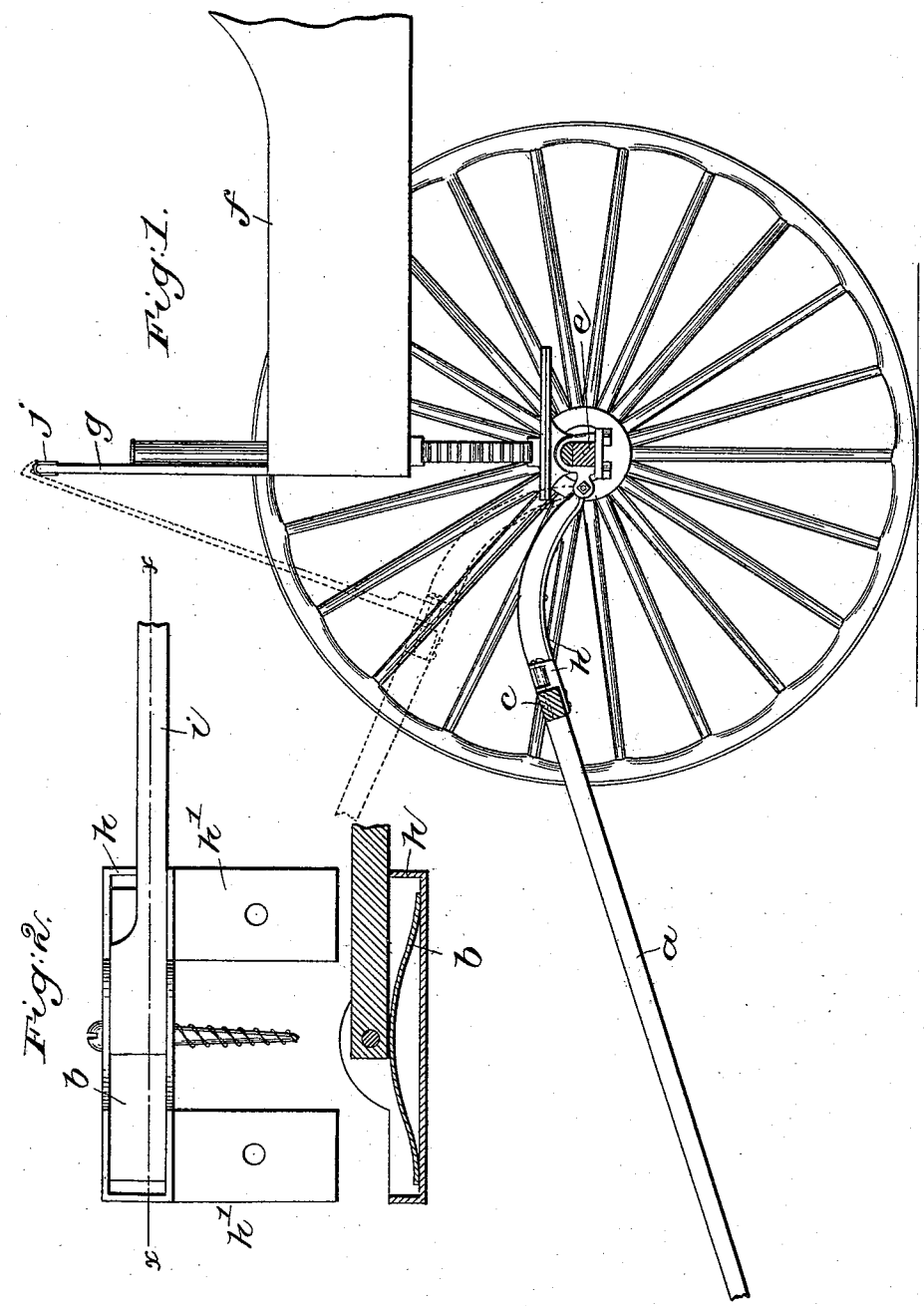
Witnesses.
Fred S. Greenleaf
Edward T. Allen
Inventor:
Charles H. Ellis.
by Crosby & Gregory
attys.

UNITED STATES PATENT OFFICE.

CHARLES H. ELLIS, OF HANOVER, MASSACHUSETTS.

VEHICLE-SHAFT SUPPORT.

SPECIFICATION forming part of Letters Patent No. 488,000, dated December 13, 1892.

Application filed January 11, 1892. Serial No. 417,730. (No model.)

*To all whom it may concern:*

Be it known that I, CHARLES H. ELLIS, of Hanover, county of Plymouth, State of Massachusetts, have invented an Improvement in Shaft-Holders, of which the following description, in connection with the accompanying drawings, is a specification, like letters on the drawings representing like parts.

This invention has for its object to improve the construction of shaft-holders for vehicles, whereby the shafts when raised may be automatically locked and may be released easily when so desired.

In accordance with this invention a hook having a long slender shank is pivoted to a box-like frame or structure secured to the under side of the cross-bar which carries the whiffletree, and means are provided for holding the said hook in its vertical and also in its horizontal position, said means being herein shown as a bowed or arched spring which is contained in the box-like structure.

Figure 1 shows in side elevation and partial section a portion of a wagon provided with a shaft-holder embodying this invention; Fig. 2, a plan view of the shaft-holder detached, on an enlarged scale, a portion of the hook being broken off to save space on the drawings; and Fig. 3, a longitudinal section of the parts shown in Fig. 2, taken on the dotted line $x\ x$.

The shafts $a$, cross-bar $c$ for the whiffletree, the axle $e$, body $f$, and dasher $g$ are all of usual or suitable construction. The box-like frame or structure $h$ has projecting from its under side two lugs or ears $h'\ h'$, which are adapted to be brought against the under side of the cross-bar $c$, astride the usual central bolt and nut, and screws or other suitable fastenings are passed through holes in said lugs or ears and into the cross-bar $c$ to thereby secure it firmly in position, with the box-like frame or structure $h$ bearing against the rear side of said cross-bar. A flat bowed or arched spring $b$ is placed in the bottom of the box-like frame or structure $h$, which is made nearly as long as the frame, the bowed or arched portion of said spring rising at the center. A hook $i$, having a long slender shank, is pivoted at its lower end to a suitable yoke or bearing in said box-like frame or structure, and the lower end of said hook is made square and adapted to bear upon said spring at its central arch or bowed portion, so that said spring will serve as the means of holding the hook either in vertical or horizontal position. When the hook is moved into its vertical position and the shafts are raised, the hooked or latched end hooks over or engages the upper edge of the dasher $g$ to thereby hold the shafts in elevated position. If the dasher is made of leather or other material which is liable to be marred or injured by said hooked end, the metallic clip $j$ is sprung onto the upper edge of the dasher in proper position to receive said hooked end when the shafts are raised. The long slender shank of the hook is made quite thin for a portion of its length that it may readily yield to assist it in performing its proper functions.

When it is desired to drop or lower the shafts, the hook is released and turned down into its horizontal position, where, it will be seen, it is practically concealed.

The box-like frame or structure, it will be understood, may be made in many ways to accommodate the hook without departing from this invention; also, that while the bowed or arched spring possesses many advantages by reason of its simplicity and readiness to act I may employ any other suitable locking or retaining device or devices by means of which the hook is held in its two different described positions.

I claim—

1. A shaft-holder consisting of a frame or structure and means for securing it to the cross-bar $c$, the hook $i$, pivoted horizontally to the frame or structure and adapted to swing upwardly into position above the cross-bar to engage a support, and means intermediate said hook and the frame or structure for retaining the hook in its vertical position, substantially as described.

2. A shaft-holder consisting of a frame or structure and means for securing it to the cross-bar, the hook $i$, pivoted horizontally to said frame or structure and adapted to be swung into position above the cross-bar to engage the dasher, and the bowed or arched spring intermediate the hook and said frame or structure for holding the hook in its vertical and in its horizontal position, substantially as described.

3. The shaft-holder consisting of the box-like frame or structure h, having lugs or ears h' h', and screws for securing said frame to the cross-bar c, the hook i, pivoted horizontally to said frame and adapted to be swung upwardly to engage the dasher, and the bowed or arched spring for holding said hook in its vertical and in its horizontal position, substantially as described.

4. The shaft-holder consisting of the box-like frame or structure h and means for securing it to the cross-bar c, the hook i, having a long slender shank and hooked end, and a clip adapted to be sprung onto the dasher in position to be engaged by said hooked end, and the bowed or arched spring for holding said hook in its vertical and also in its horizontal position, substantially as described.

In testimony whereof I have signed my name to this specification in the presence of two subscribing witnesses.

CHARLES H. ELLIS.

Witnesses:
   CHAS. H. KILLAM,
   GEORGE C. RUSSELL.